Patented June 26, 1945

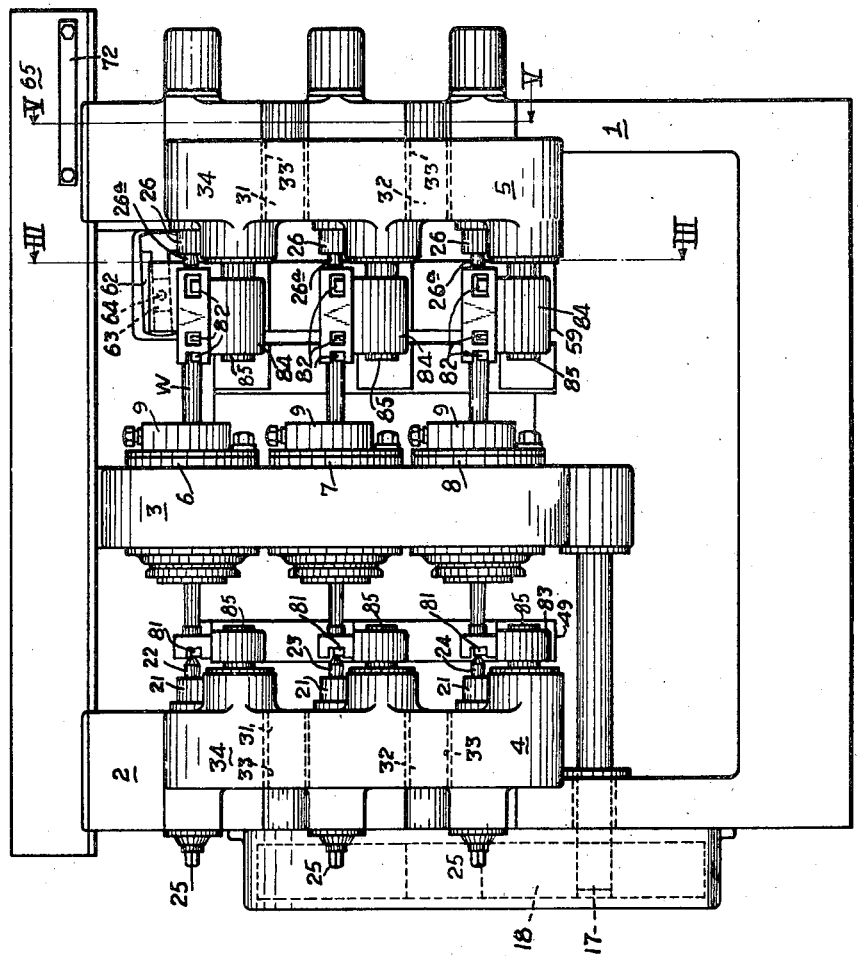

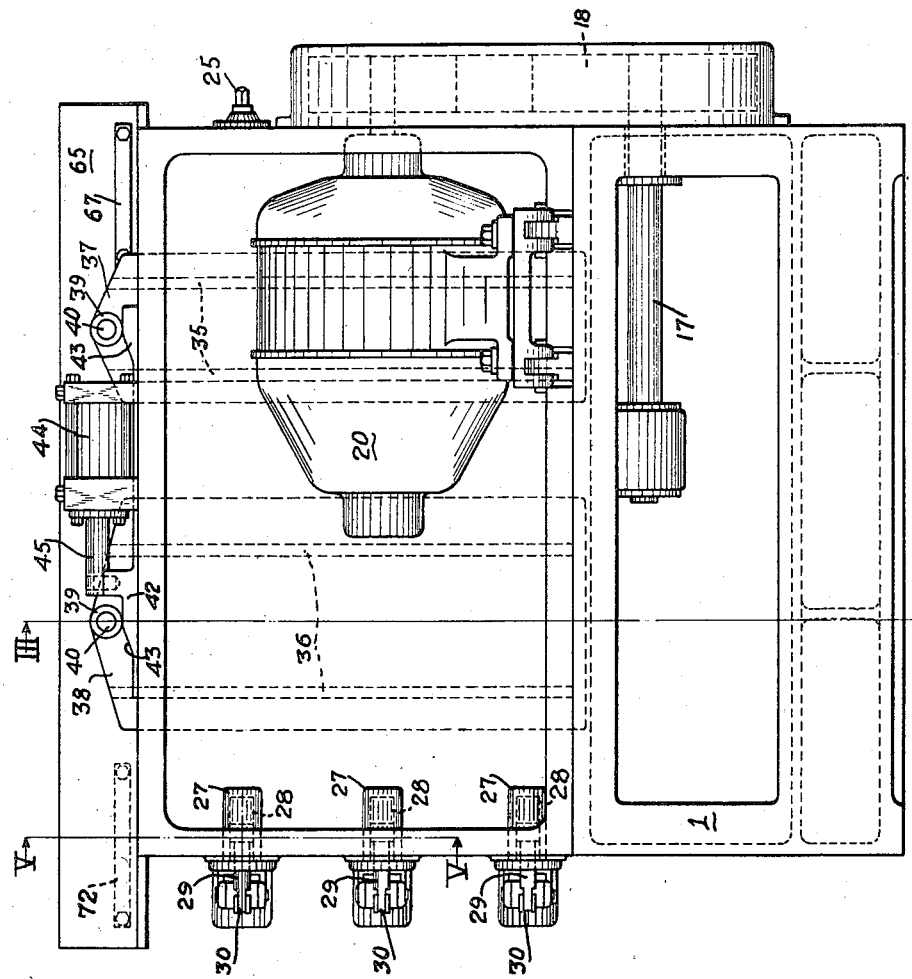

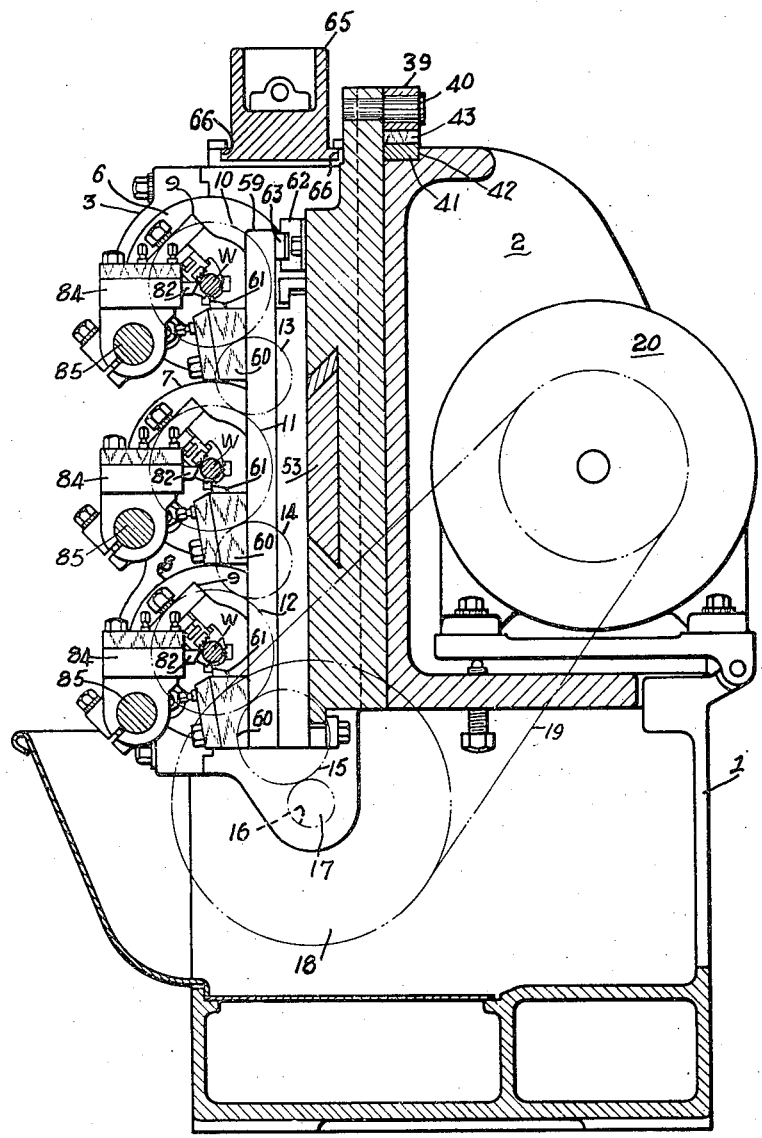
FIG. III

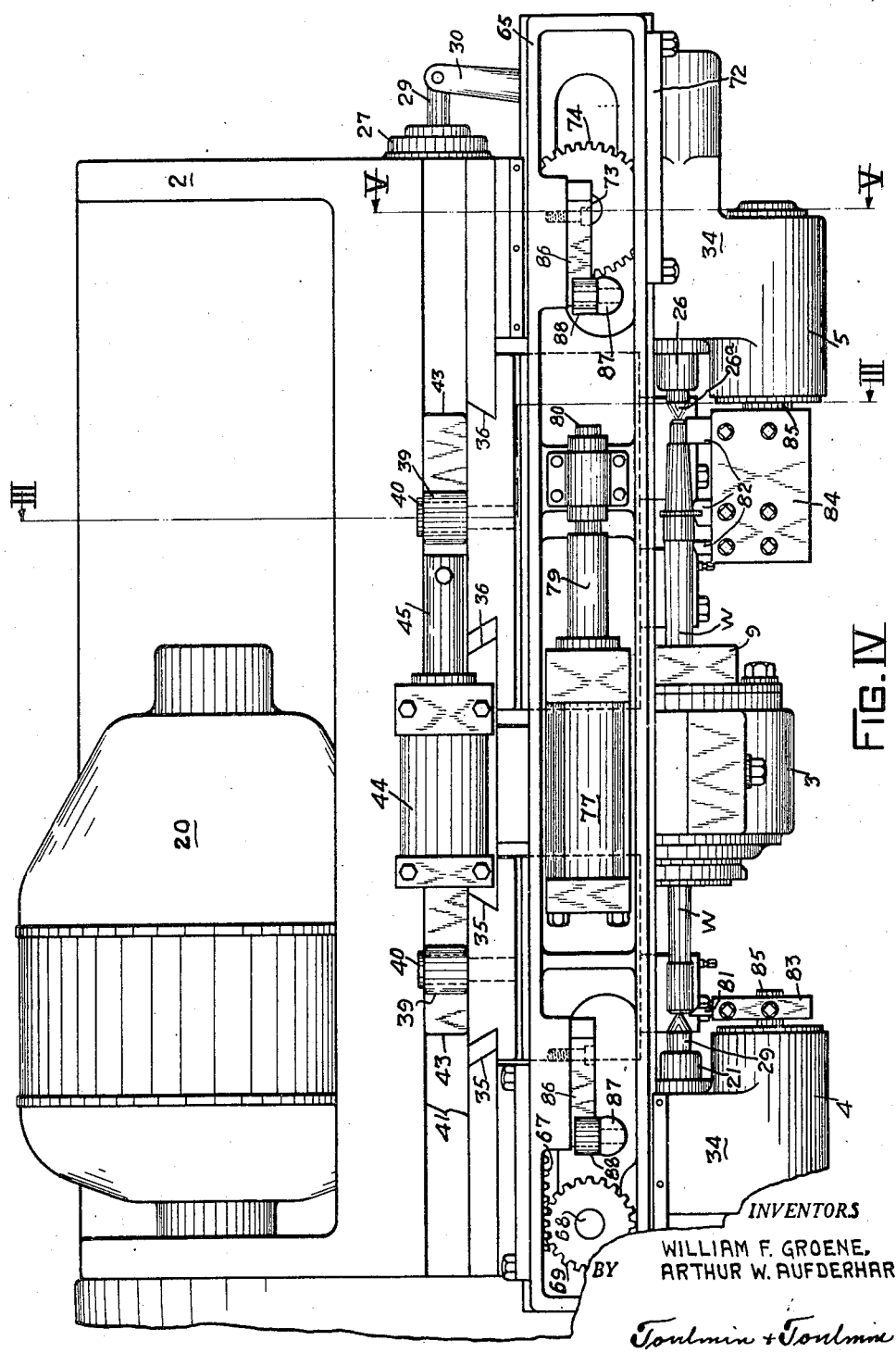

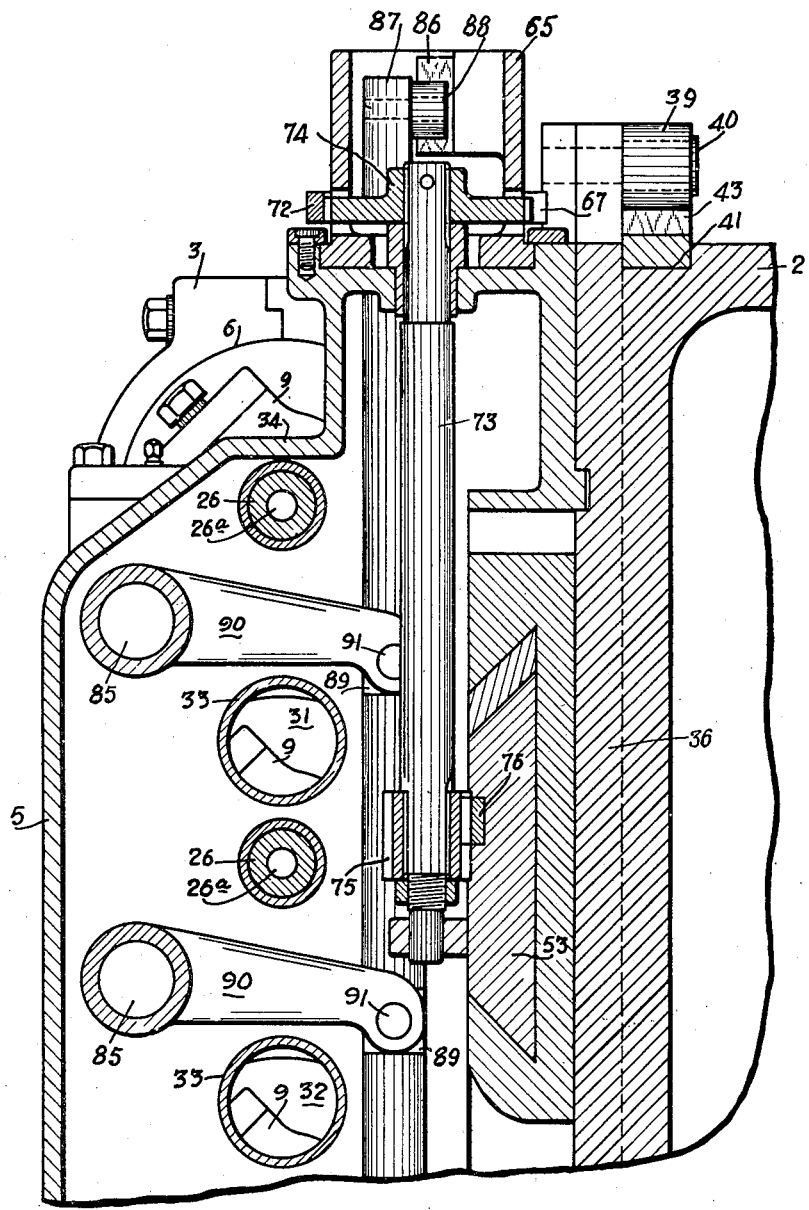
FIG. V

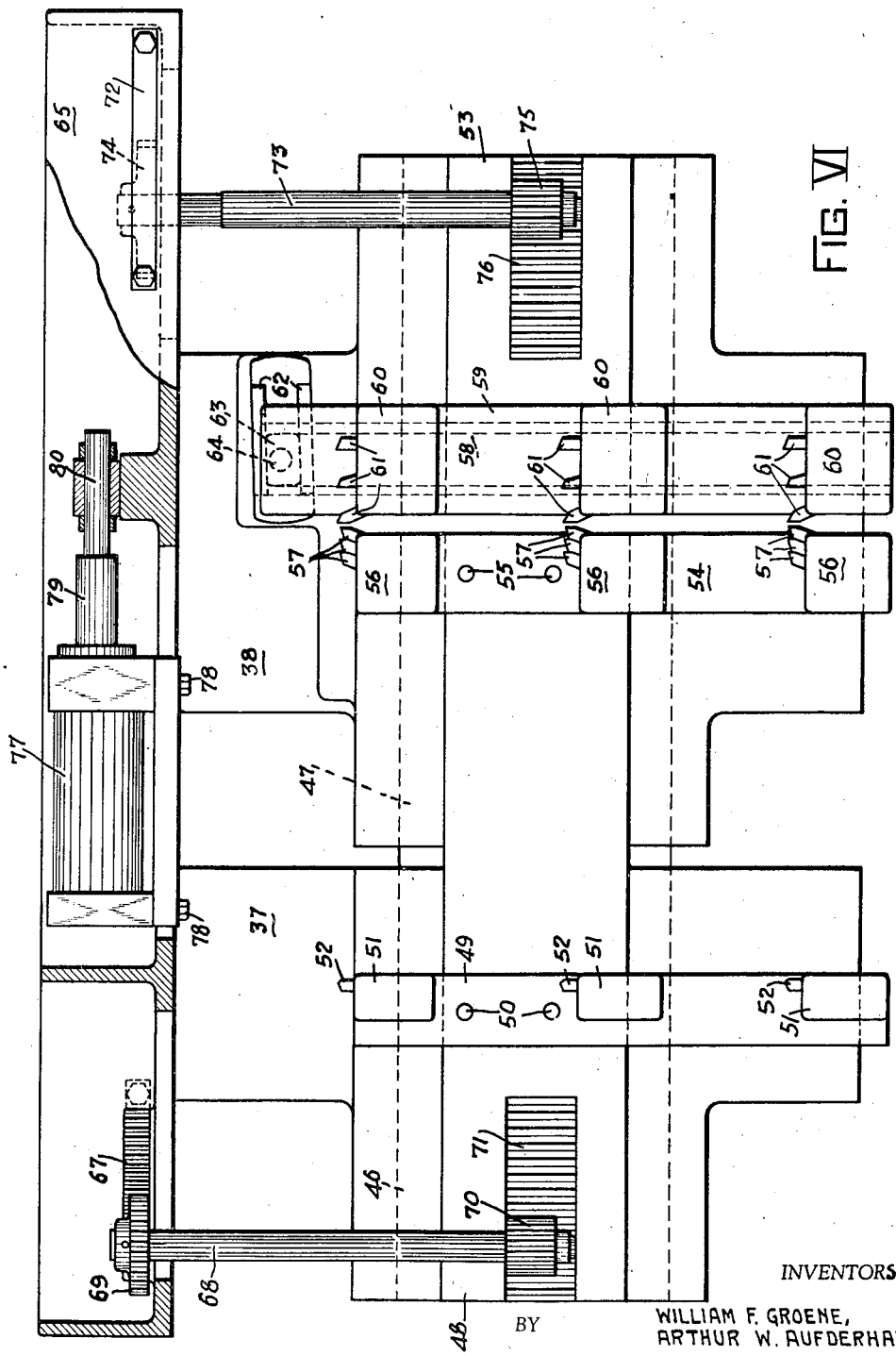

2,379,147

UNITED STATES PATENT OFFICE 2,379,147

AUTOMATIC LATHE

William F. Groene and Arthur W. Aufderhar, Cincinnati, Ohio, assignors to The R. K. Le Blond Machine Tool Company, Cincinnati, Ohio, a corporation of Delaware Original application June 20, 1942, Serial No. 447,810. Divided and this application November 6, 1944, Serial No. 562,080

8 Claims. (Cl. 82—2)

This invention relates to multiple spindle lathes wherein a plurality of workpieces are simultaneously turned to duplicate form. It is known in lathes of such type, to mount the tailstocks on slides extending at an angle to the work axes, and to provide mechanism for so sliding the tailstocks out of their work position to permit the workpieces to be loaded into the lathe in an axial direction. Such machines, while mechanically sound, require expensive complications in the slides and operating mechanism therefor. Our invention provides a multiple-spindle lathe which, while retaining all the advantages of axially-loaded lathes of the type aforesaid, eliminates numerous parts previously deemed necessary and turns out work of a very high degree of accuracy while, at the same time, saving large amounts of time by providing clear and unobstructed passageways through the lathe for loading and unloading. While the invention is perhaps best illustrated and may find its greatest usefulness in connection with center-drive lathes, it is not so limited, but is equally applicable in multiple-spindle lathes using conventional headstocks and tailstocks.

It is an object of our invention therefore, to provide a multiple spindle lathe with tailstocks sliding in an axial direction only, that may be loaded in an axial direction.

It is another object to provide a lathe as in the preceding paragraph, having two tailstocks and center drive chucks, that may be loaded from either end.

It is a further object to provide a lathe with loading openings or apertures between adjacent tailstocks through which workpieces may be passed into the lathe without any substantial angular movement thereof.

A further object is to so correlate the tool blocks and means for carrying them, with loading openings in the tailstocks, as to provide free, unobstructed loading passageways through the lathe when the tool blocks are in retracted or idle position whereby efficient and time-saving loading and unloading of the lathe are assured.

It is a further object of our invention to provide a carrier for the tool blocks offset from the work axes and whereon each block is located beneath a corresponding work axis defined by a pair of spindles, the tool blocks being spaced vertically to provide openings therebetween in alignment with corresponding loading openings in the tailstocks when the blocks are in idle position.

Other objects and advantages of our invention will appear as the description proceeds.

In the drawings:

Figure I, is a front elevational view of the multiple spindle center drive lathe of this invention, particularly showing the location of the center drive work spindle housing, the end tailstock housing, the loading passageways through the tailstock housing for axial insertion of the work pieces in the center drive chucks on the work spindle, and also showing the swinging facing tools mounted on the tailstock housing.

Figure II, is a rear elevational view of the machine shown in Figure I, particularly showing the main drive motor for rotating the work spindles, the tool relief cam mechanism for the turning tool slides, and the fluid pressure actuating cylinders for operating the centers in the left hand tailstock.

Figure III is a vertical transverse section shown on the line III—III of Figures I, II, and IV, particularly showing the relationship of the turning tools on the turning tool slide, the taper attachment mechanism of the turning tool slides, and the swinging facing tools mounted on the tailstock housing.

Figure IV is a fragmentary enlarged plan view of the machine of Figures I and II particularly showing the cam feeding mechanism, the cam tool relief means for the turning tools, and showing the application of the facing tools to a work piece in the top work spindle of the machine.

Figure V is an enlarged fragmentary transverse section through the machine on the lines V—V of Figures I, II, and IV, particularly showing the rack and pinion actuating mechanism for effecting the turning feeding movement for the turning tool slide, and Figure VI is an enlarged diagrammatic view of the feeding mechanism for the turning tool slides.

Referring now to the drawings in which like reference numerals identify corresponding parts throughout, the numeral 1 indicates a base upon which is mounted a frame 2 (Figures I, II and V). A work spindle housing 3 is fixed to frame 2 and in the particular machine shown, this housing is of the center drive type. Thus there are provided a tailstock housing 4 at the left as viewed in Figure I, and a second tailstock housing 5 at the right.

Drive housing 3 has vertically aligned work spindles 6, 7, 8 journaled therein. Each spindle carries conventional chucking devices 9 whereby the work is gripped and rotated as the spindles are turned. This turning is effected by ring gears 10, 11, and 12 (Figure III), connected by idlers 13 and 14 so that all of the ring gears rotate synchronously in the same direction. The lowermost ring gear 12 meshes with an idler gear 15, in turn driven by a pinion 16 on a main drive shaft 17. This drive shaft 17 carries a main drive pulley 18 which is driven by belts 19 from the main drive motor 20.

Tailstock barrels 21 are mounted in the left hand tailstock 4. Each barrel carries a work center 22, 23 and 24, respectively, and each barrel is adapted for actuation by conventional screw means having squared heads 25 whereby the centers may be properly adjusted to engage center holes in the ends of the workpieces W.

The right hand tailstock 5 has similar axially reciprocable barrels 26 having centers 26a and being actuated by individual hydraulic mechanisms each comprising a hydraulic cylinder 27 (Figure II) having a piston 28 therein. Each piston operates a rod 29, the free end of which is connected to one end of a lever 30. (See also Figure IV.) Each lever is pivoted at its central part on frame 2 and, at its other end, to a respective one of barrels 26. Fluid pressure connections not shown lead to each cylinder, on opposite sides of the piston whereby all pistons may be simultaneously reciprocated in the same direction to withdraw barrels 26 and centers 26a from the finished workpieces and to move them into engagement with unfinished workpieces after they have been loaded into the lathe. This feature forms no part of our present invention. For a more complete description thereof, reference is made to our copending application, 447,810, filed June 20, 1942, of which the present application is a division.

Tailstock 4 (and this is true of tailstock 5 also) is in the form of a unitary member or casting, rigidly attached to frame 2 of the machine. This form of tailstock, while very desirable from the point of rigidity and accuracy of the finished workpieces, presents problems in loading which we have overcome in a novel manner by providing loading openings 31 in said tailstock housings between each of the uppermost and intermediate tailstocks, and openings 32 between each of the intermediate and lowermost tailstocks. Each opening is lined with a sleeve 33 whereby dirt and chips are kept out of the hollow housings 4 and 5. In the case of the uppermost spindle, the workpiece is simply loaded over the top surface 34, through the top chuck 9, into contact with center 22. The intermediate spindle is loaded by inserting its workpiece through opening 31 thence through chuck 9 and into contact with center 23, and the lowermost spindle is loaded by inserting its workpiece through opening 32, lowermost chuck 9 and into contact with center 24. It will be noted, therefore, that the intermediate spindle of the lathe, for example, is loaded in the preferred manner, by moving a workpiece adjacent the lathe tailstock 5 so that it is parallel to the spindle axes of the lathe, and thereafter sliding it through opening 31, tilting it downwardly to pass through the center opening of intermediate chuck 9 and finally giving it a combined translation and tilt to bring it into coincidence with the axis of its spindle and with one end in engagement with tailstock center 23. Each of the other spindles is loaded by a like movement, the only difference being that the uppermost spindle is loaded by moving the workpiece over the top surface 34 instead of through an opening 31 or 32. After all spindles have been loaded in this manner, fluid under pressure is admitted to cylinders 27 to axially move centers 26a into contact with the adjacent ends of the respective workpieces, chucks 9 are closed in a conventional manner to grip the workpieces, and the lathe is then ready for operation. After the workpieces have been finished, chucks 9 are opened, tailstock barrels 26 and centers 26a are retracted by operation of pistons 28, and each workpiece is tilted upwardly and slid to the left, Figure I, through an opening 31 or 32 or over top 34, as the case may be. This manner of loading and unloading a multiple-spindle lathe saves much time over the conventional side-loading procedure heretofore used. Except for the slight tilting movement to insert and withdraw the workpieces from the open chucks, said workpieces have only an axial translatory motion from the time they are moved up to the lathe until they are taken away. The elimination of lost motion and consequent saving of time are obvious, while all lateral motion of the tailstocks and consequent complicated mechanism for effecting such motion, are avoided.

Referring to Figure II, the frame 2 of the machine is formed with vertically extending dovetail guideways 35 and 36. A tool relief member 37 is guided for vertical sliding only in guideway 35 while a second tool relief member 38 is similarly guided by guideway 36. Each member 37 and 38 has a roller 39, mounted on a pin 40, as seen in Figure II. A guideway 41 (Figure III), is located along the top of frame 2 just beneath rollers 39. A relief cam slide 42 is movable in guideway 41 and has formed thereon relief cams 43 each supporting one of the rollers 39. Each cam consists of two horizontal dwells or flats, connected by a slope whereby, when the slide 42 is shifted from a position as shown in Figure II, to the right, rollers 39 ride down the slopes and permit tool relief members 37 and 38 to move downwardly a definite limited distance under their own weight, as will be apparent from an inspection of Figure II. Relief cam slide 42 is shifted along its guideway by a cylinder 44 fixed to frame 2 and having a piston and attached rod 45 fixed to said member. Control means not shown operates to admit fluid under pressure to, and exhaust it from, opposite ends of said cylinder 44, whereby slide 42 is moved and the relief members raised and lowered at the proper times in the operating cycle of the machine for a purpose that will be explained subsequently.

Referring next to Figure VI, the tool relief member 37 has a dovetail channel 46 therein extending at right angles to its own direction of motion in frame 2. Tool relief member 38 has a similar dovetail channel 47 therein. The two channels 46 and 47 are aligned as shown in Figure VI, and a feeding slide 48 is slidably mounted in both of them.

A plate 49 is fixed to the feeding slide 48 by screws 50. Said plate extends vertically and has attached thereto spaced tool blocks 51 each of which carries a tool 52. The parts are so proportioned that each tool 52 is properly located for operation on a workpiece in a respective spindle when tool relief member 37 is raised by cam slide 42, and lowered out of contact with said workpiece when tool relief member 37 is lowered by proper actuation of slide 42, as has been previously described. Feeding slide 48 also carries a second plate 54, rigidly fixed thereto by screws 55. Plate 54 has spaced tool blocks 56 rigidly attached thereto each carrying, for this particular job, a series of tools 57 for a purpose to be described. These tools, of course, are moved up and down toward and from their respective spindle axes by tool relief member 37 synchronously, and to the same extent as tools 52.

A feeding slide 53 is slidably mounted in the dovetail channel 47 of tool relief member 38. This feeding slide has a dovetail guideway 58 therein parallel to the guideway 36 in which its tool relief member 38 slides. A sliding bar member 59 is guided by this guideway. This member carries spaced tool blocks 60 each of which has tapering tools 61 therein. Relief member 38 has a taper attachment bar 62 fixed thereto. A guideway is formed in this bar with an axis inclined at an angle to the axes of the work spindles. This angle is determined by the taper of the portion of the workpiece to be operated upon. A shoe 63 slidably fits said guideway and has a hole fitting a pin 64 fixed to sliding bar member 59. By this construction, as feeding slide 53 is moved axially of the work, bar member 59 and its attached tool blocks 60 and tools 61 move axially to the same extent and they also move radially of the spindle axes whereby the proper tapering cut is effected upon the workpieces.

Axial movement of feeding slides 48 and 53 is effected by mechanism including a box-shaped feeding slide 65 (Figures I to VI) mounted in guideways 66 formed in the top of tailstock housings 4 and 5. This slide is guided for movement parallel to the work spindle axes and has a rack 67 on the rear inner wall of its lefthand end as viewed in Figure VI. A shaft 68 is journaled in frame 2 of the machine and at its top carries a pinion 69 meshing with rack 67, and, at its lower end, a pinion 70 meshing with a rack 71 formed in, or attached to, feeding slide 48. Said slide 65, at its right hand end, as viewed in Figure VI, and on the inside of its forward wall, carries a second rack 72. A shaft 73 is journaled on frame 2. This shaft has at its top, a pinion 74 meshing with rack 72 and, adjacent its lower end, a pinion 75 meshing with a rack 76 integral with, or attached to, feeding slide 53. By this construction, as the box-shaped feeding slide 65, is actuated, pinions 69, 74, 70, and 75, together with shafts 68 and 73 are turned, to thereby move slides 48 and 53 and the tool blocks and tools mounted thereon, in a direction parallel to the axes of the work spindles. A cylinder 77 is secured to the top of frame 2 by bolts 78. Said cylinder has connections, not shown, for controlling the admission and exhaust of fluid under pressure to the opposite sides of a piston therein. Said piston is attached to a piston rod 79. The outer end of said rod 79 is attached as at 80 to box-shaped feeding slide 65. Therefore, as pressure is admitted to one end or the other, of cylinder 77, slide 65 is moved and feeding slides 48 and 53 are simultaneously moved in opposite directions axially of the work. It will be noted, too, that racks 71 and 76 are made wider than their respective driven pinions 70 and 75 so that meshing engagement between these parts is maintained despite vertical movements of tool relief members 37 and 38, as previously described. It will also be noted that, for example, upper tool blocks 51, 56, and 60 are in alignment axially of the work spindles. The same is true for the corresponding intermediate tool blocks and for the lower tool blocks. Referring to Figure III, it is seen that all of these blocks, such as 51, mounted upon the same plate 49, are spaced vertically and form between them spaces or passageways. When tool relief members 37 and 38 are in lowermost position, prior to the start of a cutting cycle, these passageways are in substantial alignment with corresponding tailstock openings 31 and 32, respectively, whereby free, unobstructed passageways are formed through which the workpieces may be loaded into the machine without loss of time and without danger of injury to the adjacent parts of the machine.

Facing tools 81 and 82 are carried in holders 83 and 84, as best seen in Figures I and III. Said holders are carried on respective rock shafts 85 journaled in tailstock housings 4 and 5 to swing on axes parallel to the work spindle axes so that the tools move in an arcuate path toward and from the work and in a plane normal to the work spindle axes. These rock shafts are actuated in feeding and return movements by boxshaped feeding member 65 by means of cams 86, Figure V, which are fixed to slide 65. Referring to Figure IV, it will be noted that rods 87 are mounted for vertical sliding movement, one in tailstock housing 4 and another in tailstock housing 5. Each rod extends upwardly through an enlarged opening in the bottom of feeding slide 65 and carries, at its upper end, a roller 88 riding on one of the cams 86. Each rod extends downwardly and terminates a little below the level of the lowermost rock shaft 85, and carries three slots, each slot being located opposite, that is to say, substantially in the same horizontal plane as, a corresponding rock shaft 85. Each rock shaft has a lever 90 fixed thereto. Each lever projects toward its actuating rod 87 and has a pin 91 in its end, each pin fitting a respective slot 89. As the box-shaped slide 65 is translated, by mechanism previously described, rollers, 88 ride downwardly in their cam and move rods 87 to turn shafts 85 and move the facing tool holders 83, 84 and the tools carried thereby, in the proper motion to effect the described facing cuts upon the workpieces.

Operation

Our lathe is illustrated, merely as an example, as working upon automobile axles requiring a cylindrical surfacing cut near each end, a taper cut adjacent one end only, a chamfering cut at one end, and facing cuts to form a collar between the larger end of the taper and one finished cylindrical surface. The axles are taken from a conveyor or truck (not shown) located at the right hand side of the machine, as viewed in Figure I, where they are positioned substantially parallel to the spindle axes. Each axle is slid off its support and (in the case of the intermediate and lower spindles), through opening 31 or 32, tilted slightly downwardly to pass through the corresponding center chuck, then leveled off until the turning opening in its leading end, fits over the left hand tailstock center 23 or 24 as the case may be. After all spindles have been loaded, fluid under pressure is admitted in the proper manner to cylinders 27, thus moving barrels 26 and centers 26a into the turning holes in the right hand ends of the workpieces to precisely position each workpiece in the machine. The center chucks are then operated to clamp the workpieces. At the beginning of a work cycle relief cams 43 are at their position farthest to the right, as viewed in Figure II, so that tool relief members 37 and 38 are in their lowermost position and tools 52 in blocks 51, tools 57 in blocks 56 and tapering tools 61 in blocks 60 are all in their lowermost position, out of contact with the work, likewise feeding slides 48 and 53 are in position shown in Figure VI, with adjacent tools 57 and 61 axially separated so as to outline between them, the desired collar on the work. Similarly rock shafts 85 are so positioned that their chamfering and facing tool holders 83, 84 are in their outermost position and tools 81 and 82 carried thereby, are out of contact with the workpieces. As shown at Figure III, the tools 52, 57, and 61 are so positioned as to engage the work at points directly underneath, while chamfering and facing tools 81, 82 are so positioned as to engage the work at points located in substantially horizontal planes through the spindle axes, and on the forward side of the workpieces.

Driving motor 20 is then started to rotate the workpieces and fluid pressure is admitted to cylinder 44 to move piston rod 45 outwardly, translate relief cam slide 42 in its guideway, cause rollers 39 to ride up the slopes of cams 43 and come to rest on the upper flats of said cams to thus positively raise tool relief members 37 and 38 in vertical guided movement. This operation moves tools 52, 57 and 61 into the workpieces to proper depth for the initial cuts. Thereafter, fluid under pressure is admitted to cylinder 77 in such manner as to drive box-shaped feeding slide 65 to the left, as viewed at Figure VI. This movement simultaneously rotates shafts 68 and 73 and, through pinion 70 and rack 71, in the case of feeding slide 48, and pinion 75 and rack 76 in the case of feeding slide 53, causes said slides to move axially of the work in opposite directions. Tools 52 and 57 are thus moved axially along their workpiece to effect the desired cylindrical cuts while tools 61 are, by reason of taper bar 62 and shoe 63, given a motion having simultaneous axial and radial components relatively to the work, to effect the desired taper cuts. At the same time, movement of slide 65 causes downward movement of rods 87 to thereby rock chamfering and facing tools 81, 82 toward and into cutting contact with the work. Precise control of fluid pressure admitted to cylinder 77 enables traverse of the cutting tools at the proper rate for the work being done. The parts are so proportioned and adjusted that, when movement of box-shaped slide 65 has been completed, all cuts are finished at one pass of the tools. Thereafter, flow of pressure fluid to cylinder 44 and 77 is reversed to first retract the tools from the work by lowering of relief members 37, 38 and then to move feeding slides 48 and 53 to initial position and simultaneously, to retract chamfering and facing tools 81, 82 from the work. The chucks are then opened and the workpieces tilted upwardly and, slid to the left as viewed in Figure I. In the case of the intermediate and lowermost workpieces, the workpieces are unloaded through tailstock openings 31 and 32 directly onto an adjacent conveyor or truck.

It will thus be seen that we have provided a combination of elements in a lathe which results in precise but rapid finishing of the work and, at the same time, effects smooth efficient, and time saving passage of the work through the machine, with all lost motion eliminated.

While, in order to comply with the patent statutes, we have described a preferred embodiment of our invention, operating upon a particular job or workpiece, it will be understood that the machine is not so limited. On the contrary, it is readily adaptive to a large number of turning jobs, while various substitutions and mechanical changes will be apparent to those skilled in this art. The invention extends to all such uses, substitutions and equivalents, as fall within the scope of the subjoined claims.

Having now described our invention, what we desire to claim and secure by U. S. Letters Patent is:

1. In a multiple spindle lathe, a frame, spaced stocks on said frame, a plurality of rotatable, superposed spindles in each stock defining spaced, parallel, coplanar work axes of rotation, there being passageways in each stock between adjacent spindles through which work pieces may be loaded into and unloaded from, said spindles, a tool relief slide movable on said frame normal to said axes, spaced tool blocks carried by slide, one for each work axis, each tool block being coplanar with, but out of alignment with said axes, whereby unobstructed passageways are formed through which workpieces may be loaded in an axial direction through either stock into the lathe.

2. In a multiple spindle lathe, a frame, spaced tailstock housings on said frame, a plurality of superposed tailstock barrels in each tailstock housing, each barrel having axial movement only in its housing, there being aligned passageways in each housing between adjacent barrels, through which workpieces may be loaded into and unloaded from said lathe in an axial direction, a vertically movable tool relief slide on said frame carrying spaced tool blocks, each block being normally below a line between corresponding passageways, and means for moving said slide to simultaneously move said blocks upwardly into working position with respect to their respective work axes.

3. A multiple spindle lathe of the center drive type comprising, a base, spaced, parallel tailstock frames fixed to said base, a plurality of vertically spaced barrels in each tailstock frame each adapted to receive a tailstock center, the corresponding centers on opposite frames forming a pair, each of said pairs of centers defining parallel work axes, there being passageways in each tailstock frame between adjacent barrels through which workpieces may be passed in an axial direction to load said lathe, a relief frame supported by said base for vertical sliding movement normal to said work axes, a feeding frame carried by said relief frame for sliding movement parallel to said work axes, a plate fixed to said feeding frame and extending normal to and offset from said work axes, and vertically spaced tool blocks fixed to said plate for holding tools for operation upon workpieces in the pairs of centers, respectively, the spaces between adjacent blocks being in alignment with a corresponding pair of passageways in opposite tailstock frames.

4. In a multiple spindle lathe, a base, two tailstock frames mounted on said base, a plurality of spaced spindles in each said frame, each spindle in one frame being aligned with a corresponding spindle in the other frame to form a pair, said pairs defining spaced, parallel, superposed work axes of rotation, a headstock on said base between said tailstock frames, intergeared work spindles in said headstock, one for each work axis, there being passageways in each frame between adjacent spindles through which workpieces may be passed to load the lathe, from either end, plate means, a plurality of vertically spaced tool blocks on said plate means one for each work axis, means mounting said plate on said base for movement normal to said axes, whereby tools in said blocks may be simultaneously raised into cutting engagement with workpieces on said centers, the spaces between adjacent blocks being aligned with corresponding passageways in said frames.

5. In a lathe, a frame, a plurality of spaced intergeared work spindles rotatably mounted in said frame, a tailstock housing connected with said frame, a plurality of tailstock barrels in said housing, each barrel aligned with a respective spindle to form a pair, said pairs defining spaced parallel and substantially coplanar work axes of rotation, means mounting each barrel for axial sliding only in said housing, tool carrier means, means mounting said carrier means for universal translation only, adjacent and parallel to the plane of said work axes, spaced tool blocks on said carrier means, each block being positioned below a respective work axis, and substantially in the plane of said axes, there being axially-extending openings in said housing intermediate each adjacent pair of barrels, each opening being aligned with the space between a corresponding pair of adjacent tool blocks whereby to provide unobstructed loading passageways through which workpieces may be loaded in an axial direction through said tailstock into the lathe.

6. In a multiple spindle lathe, a plurality of superposed intergeared driving spindles, a tailstock housing, a plurality of superposed spindles in said housing, each aligned with a respective driving spindle to form spaced substantially coplanar work axes of rotation, a tool block carrier, means mounting said carrier for translation only in a plane offset from but parallel to, the plane of said work axes, spaced tool blocks on said carrier, each located adjacent a corresponding work axis and in the plane thereof, there being openings in said housing between adjacent centers through which workpieces may be loaded in an axial direction into said lathe, each opening being in substantial axial alignment with a corresponding space between adjacent tool blocks whereby unobstructed axially-extending loading passageways into said lathe are provided.

7. In a multiple spindle center drive lathe, a base, two spaced tailstock housings on said base, a plurality of spaced barrels in each housing, each barrel being aligned with a corresponding barrel in the other tailstock to form a pair, said pairs defining spaced, coplanar work axes of rotation, a frame on said base between said housings, a plurality of intergeared work spindles on said frame, each aligned with a respective work axis, a plate means parallel to and offset from the plane of said axes, means mounting said plate means on said base for translation only parallel to said plane, a plurality of spaced tool blocks on said plate means, each block lying in said plane immediately below a respective work axis, there being openings in each said housing between adjacent barrels, each opening being aligned with the space between corresponding adjacent tool blocks whereby workpieces may be axially loaded through said openings into said lathe.

8. In a lathe, a frame, a pair of spaced tailstock housings mounted on said frame, a plurality of centers in each housing, each center defining, with a corresponding center in the other housing, a work axis of rotation, all said axes being substantially parallel and lying in a common plane, a plurality of center drive work spindles between said housings, each aligned with a respective work axis, means for actuating said centers in an axial direction to engage workpieces, a tool relief member translatable on said frame between idle and operating positions, in a direction normal to said axes, and in a plane parallel thereto, a feeding slide translatable on said member parallel to said axes, spaced tool blocks on said slide, each block being immediately adjacent a respective axis and lying substantially in the plane of said axes, power means for translating said member and blocks between idle and operating position, and power means for translating said slide axially whereby tools in said blocks may operate upon workpieces in the lathe, there being openings in each housing between adjacent centers, each opening forming a pair with a corresponding opening in the other housing, each pair of openings being aligned with the corresponding space between adjacent blocks when said member is in idle position.

WILLIAM F. GROENE.
ARTHUR W. AUFDERHAR.